(12) United States Patent
McCauley

(10) Patent No.: US 8,447,559 B2
(45) Date of Patent: May 21, 2013

(54) SYSTEMS AND METHODS FOR AN IMPACT LOCATION AND AMPLITUDE SENSOR

(75) Inventor: Jack J. McCauley, Danville, CA (US)

(73) Assignee: R0R3 Devices, Inc., Livermore, CA (US)

(*) Notice: Subject to any disclaimer, the term of this patent is extended or adjusted under 35 U.S.C. 154(b) by 648 days.

(21) Appl. No.: 12/365,169

(22) Filed: Feb. 3, 2009

(65) Prior Publication Data

US 2010/0198528 A1 Aug. 5, 2010

(51) Int. Cl.
*G01C 9/10* (2006.01)

(52) U.S. Cl.
USPC .......... 702/150; 702/94; 702/127; 702/152; 702/158

(58) Field of Classification Search
USPC .................... 702/150; 473/154, 190
See application file for complete search history.

(56) References Cited

U.S. PATENT DOCUMENTS

| | | | | | |
|---|---|---|---|---|---|
| 4,915,384 | A | * | 4/1990 | Bear | 473/451 |
| 4,991,850 | A | * | 2/1991 | Wilhlem | 473/233 |
| 5,478,077 | A | * | 12/1995 | Miyahara | 473/154 |
| 5,796,005 | A | * | 8/1998 | Frolow | 73/651 |
| 2004/0005938 | A1 | * | 1/2004 | Saegusa et al. | 473/409 |
| 2005/0075846 | A1 | * | 4/2005 | Kim | 703/1 |
| 2007/0078018 | A1 | * | 4/2007 | Kellogg et al. | 473/151 |
| 2007/0094045 | A1 | | 4/2007 | Cobbs et al. | |
| 2007/0143324 | A1 | | 6/2007 | Eichhorst | |
| 2007/0185987 | A1 | | 8/2007 | Dieberger et al. | |
| 2008/0280588 | A1 | | 11/2008 | Roundtree et al. | |
| 2009/0150820 | A1 | | 6/2009 | Hayman | |
| 2009/0294186 | A1 | * | 12/2009 | Fontanella et al. | 178/18.06 |

OTHER PUBLICATIONS

ISA/KR, PCT International Search Report and Written Opinion, Application No. PCT/IB2010/002417, dated Jun. 24, 2011, 9 pages.

* cited by examiner

*Primary Examiner* — Elias Desta
(74) *Attorney, Agent, or Firm* — Kang Lim

(57) ABSTRACT

An impact location and amplitude sensory system is provided. Such an impact sensory system may be useful in conjunction with gaming, education, as a control and feedback mechanism for virtually any surface. One embodiment of the impact sensory system may include at least one sensor and a signal processor. The sensor(s) may couple to the object. Sensors may include any of microphones and accelerometers. The sensor(s) receive an impact wave from an impact to the object, either as a propagating acoustic wave or as a traverse phase shift in natural oscillation. The sensor(s) may generate an impact signal in response to the sensed impact wave. The signal processor may couple to the sensor(s). The signal processor may include a preamplifier, an impact triangulator, and an outputter. The impact triangulater may identify a location of the impact from the impact signals. The outputter may then output data regarding the location of the impact.

10 Claims, 16 Drawing Sheets

SYSTEMS AND METHODS FOR AN IMPACT LOCATION AND AMPLITUDE SENSOR

BACKGROUND OF THE INVENTION

The present invention relates to impact sensation. More particularly, the present invention relates to generating information as to the location and amplitude of an impact force.

The ability to sense impacts has importance in a wide range of devices. For example, impact sensation may be used in automobiles for deployment of airbags. A computer keyboard senses impact on the keys to input text information to the computer. Likewise, most controller mechanisms, be they television equipment controllers, music keyboards or gaming controllers, require some level of impact sensation.

Currently, the use of impact sensation in devices is typically limited by economic and logistic constraints. Typical impact sensory mechanisms include an array of sensors, such as the individual keys of a keyboard. Sensors which receive an impact force output a signal. The location of the sensor(s) thus indicates the location of impact. Thus, for a large impact surface, a very large array of sensors may be required to accurately sense location of the impact. Such arrays may be overly costly for many applications.

Additional methods for determining point of impact are also known. Such methods may include projectile tracking. Tracking may be visual, heat, or may include radio signal tracking. Tracking, while effective, is often uneconomical or infeasible for many applications. Likewise, determining amplitude of impact force may be difficult via tracking methods.

Due to these limitations in sensing impact locations, impact sensory systems are omitted from many surfaces where impact sensation is desired. Examples include gaming surfaces and surfaces where control or feedback is desired. Particular examples may include paintball body armor, table tennis surfaces, squash or racquetball court walls, and boxing dummies.

Hence there is a need for an improved impact location and amplitude sensory system and method. Such a system may provide economical impact data for virtually any preexisting object. Such a system may enable impact measurements in a wide range of appliances and applications where it would have never before been feasible.

SUMMARY OF THE INVENTION

To achieve the foregoing and in accordance with the present invention, an impact location and amplitude sensor is provided. Such an impact location and amplitude sensor may be useful in conjunction with gaming, education, as a control and feedback mechanism for virtually any surface.

One embodiment of the impact sensory system may be designed for use in sensing impacts on an object. The impact sensory system may include at least one sensor and a signal processor. The sensor(s) may couple to the object. The sensor(s) receive an impact wave from an impact to the object. The sensor(s) may generate an impact signal in response to the sensed impact wave.

The signal processor may couple to the sensor(s). The signal processor may include a preamplifier, an impact triangulator, and an outputter. The preamplifier may amplify the received impact signals. The impact triangulater may identify a location of the impact from the impact signals. The outputter may then output data regarding the location of the impact.

In some embodiments, the signal processor may also include a signal amplitude calibrator which identifies the force of the impact by referencing the impact signals with the location of the impact.

The impact sensor(s) may be either microphones, accelerometers, or a combination. Microphones may sense audio waves. When the sensors are microphones, the impact triangulater uses a wave propagation model of the object to identify the location of the impact. Latency of the impact signals from the sensors is used to identify the location of the impact. The signal processor may include a band pass filter for excluding resonant frequencies of the microphones from the impact signals.

When the sensors are accelerometers, the object's accelerations may be sensed. The signal processor may include a signal offset detector for measuring phase shifts from a natural frequency of the object. The phase shifts result from the impact. The impact triangulater uses the measured phase shift to identify the location of the impact.

In some embodiments, the impact sensory system is integrated into a soccer response system. Such a soccer response system may include at least one sensory panel. These panels may form a ring in which the player may kick a soccer ball. The sensory panels include the sensor(s) for receiving an impact wave from an impact of the ball on said panel.

Note that the various features of the present invention can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
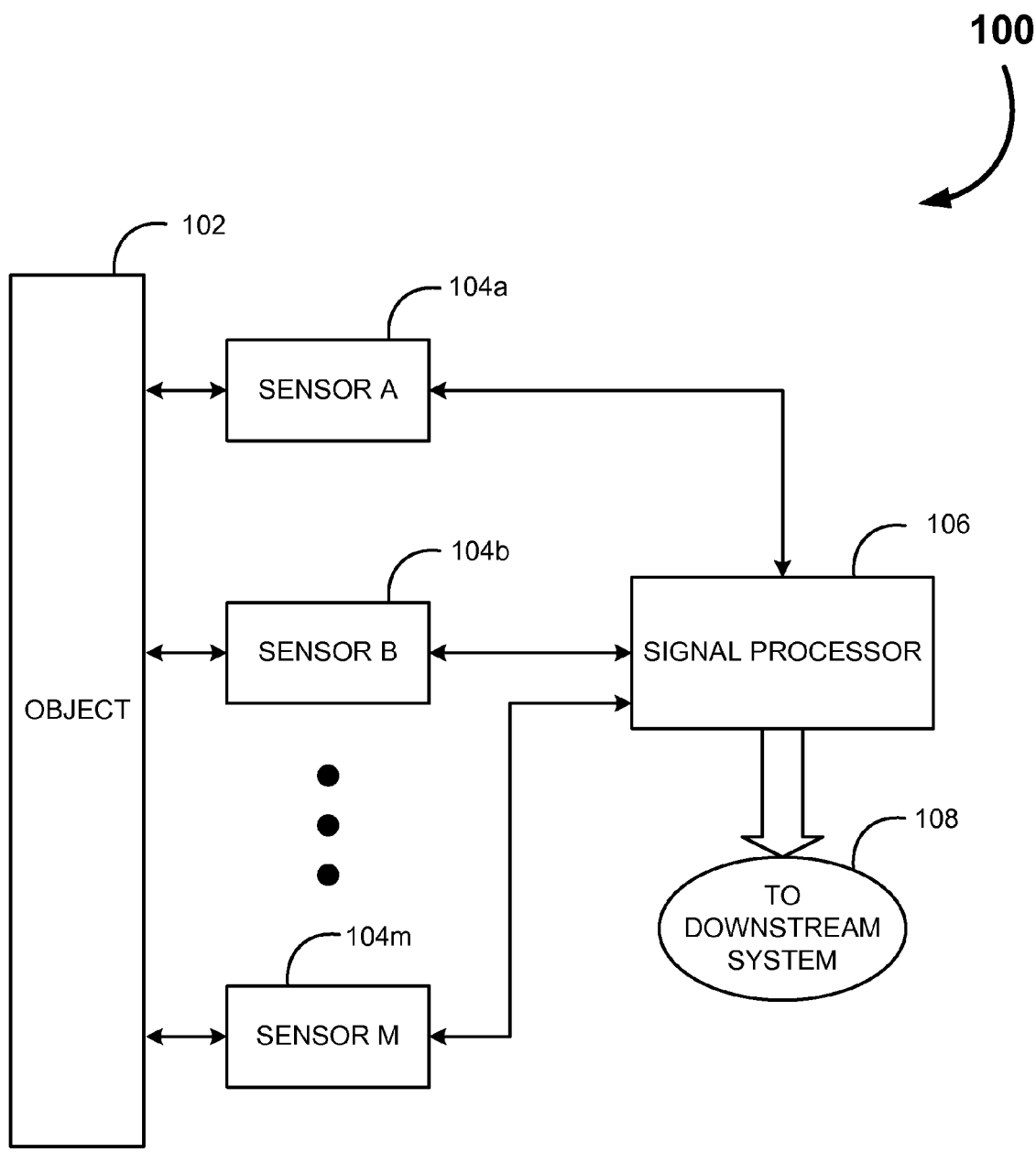
FIG. 1 illustrates an embodiment of a block diagram of the impact location and amplitude sensory system in accordance with an embodiment of the present invention.

To facilitate discussion, FIG. 1 illustrates an embodiment of a block diagram of the Impact Location and Amplitude Sensory System 100. An Object 102 may be seen coupled to one or more Sensors 104a to Sensors 104a to 104m. The Object 102 may be any object, including preexisting objects. Thus, in some embodiments, the Sensors 104a to 104m may be coupled to an old object.

In some embodiments, it is preferable that the Object 102 be of known dimension and composition as wave propagation through the Object 102 is used to determine impact origination location and amplitude of the impact force. For example, regularly shaped wood, metal or other consistent material may be ideal for detection of impact origination. Of course, an Object 102 of inconsistent composition or shape is covered by this invention.

There may be any number of Sensors 104a to 104m coupled to the Object 102. A singular Sensor 104a may provide information as to if an impact occurs, however, location or amplitude information may be lacking. In some embodiments, two Sensors 104a and 104b may be coupled to the Object 102. Two Sensors 104a and 104b may provide sufficient information as to impact location and amplitude on a line. Thus if the Object 102 is narrow, or is intended to be struck along a line, two Sensors 104a and 104b may be wholly adequate for sensing impact locations and/or amplitude.

For greater accuracy of impact location, three Sensors 104a to 104m may be utilized. The waves which propagate to each of the three Sensors 104a to 104m may be used to triangulate the location of impact. In some embodiments, more than three Sensors 104a to 104m may be used to redundantly confirm impact location. Under normal conditions it may be unnecessary to have more than three Sensors 104a to 104m; however, with highly irregularly shaped Object 102, it may be desirous to have more than three Sensors 104a to 104m. Likewise, when the Object 102 has non-uniform composition, or where accuracy is paramount, more than three Sensors 104a to 104m may be beneficial.

In some embodiments, the Sensors 104a to 104m may be piezoelectric sensors for sensing sound waves which propagate through the Object 102. These waves travel through the Object 102 in a longitudinal direction along the major axis of the Object 102. Thus, for example, in a bar of material, these longitudinal waves may propagate along the bar's length. While piezoelectric sensors are disclosed as being used to collect sound wave signals, additional sensor types are considered by the present invention including membrane and magnet type microphones and transducers.

In some alternate embodiments, the Sensors 104a to 104m may be accelerometers for measuring vibration changes in the Object 102. These vibrations are transverse waves that naturally occur in the Object 102. Impact on the object causes shifting of the natural transverse vibrations that may be measured and used to generate location data. Using the example of a bar from above, transverse waves are the natural oscillation of the bar perpendicular to its length.

Likewise, the Sensors 104a to 104m may include some combination of piezoelectric sensors and accelerometers.

The Sensors 104a to 104m may be adhered to the surface of the Object 102. Adhesion may utilize glues, welding, or integrated housings. In some alternate embodiments, the Sensors 104a to 104m may be imbedded within the body of the Object 102.

Impact waves which are sensed by the Sensors 104a to 104m may be converted into an electrical signal and sent to the Signal Processor 106. The Signal Processor 106 may perform all operations necessary to determine location of the impact and, in some embodiments, may additionally sense amplitude of the impact force. The Signal Processor 106 may generate data for downstream systems which may be outputted to those downstream systems/applications at 108. It should be noted that the Signal Processor 106 may include dedicated hardware, or may include emulative software on a computer or game consol system.

Figure 2A:
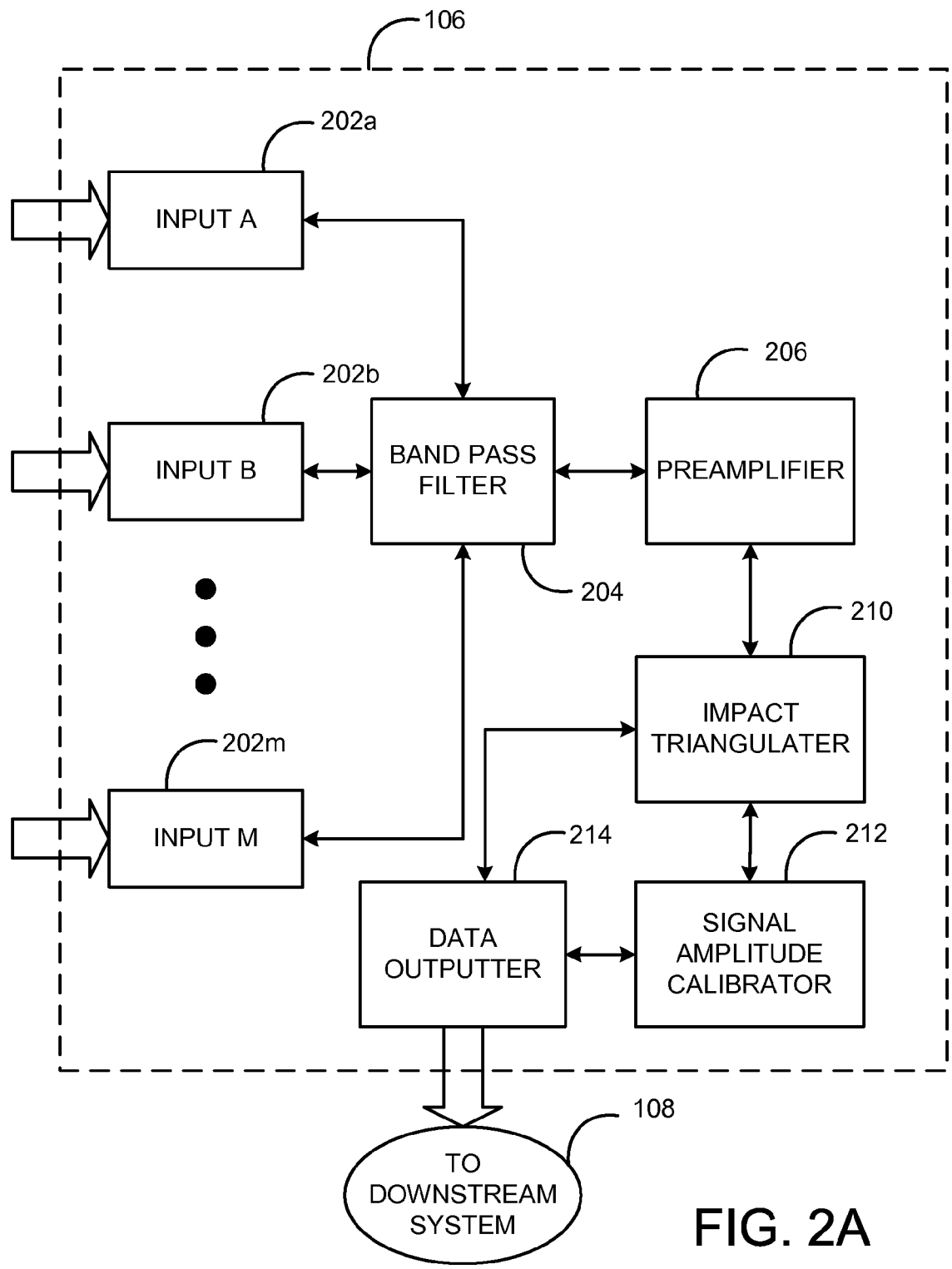
FIG. 2A illustrates an embodiment of a block diagram of the signal processor of the impact location and amplitude sensory system in accordance with an embodiment of the present invention.

FIG. 2A illustrates an embodiment of a block diagram of the Signal Processor 106 of the Impact Location and Amplitude Sensory System 100. Signals from the Sensors 104a to 104m may be received by the one or more Inputs 202a to 202m. In some embodiments, Inputs 202a to 202m may correspond on a one-to-one basis with the Sensors 104a to 104m. The illustrated Signal Processor 106 may be of particular use with Sensors 104a to 104m which are piezoelectric transducers or microphones.

The signals from the Inputs 202a to 202m may then be sent to a Band Pass Filter 204. Typical piezoelectric sensors have a natural resonance. This resonant oscillation may interfere with input signals in some embodiments. Typically, the piezos resonate at a relatively high frequency, often at 20,000 to 30,000 Hz or higher. The Band Pass Filter 204 may be a low pass filter designed to filter out any signals in the frequency range of the piezo resonant frequency. The filtered signals may then be sent to the Preamplifier 206 for amplification. In some embodiments, additional signal conditioning may be performed by the Band Pass Filter 204 and Preamplifier 206. The conditioned signals may then be sent to the Impact Triangulater 210 for triangulation of the impact location.

When a single Sensor 104a is in use, location may be difficult to determine. While it is considered within this application that phase variances in signals, echo effects and reverberations could be modeled to generate location data from a single sensor, typically multiple sensors are more adapted to generate impact location data.

By knowing the speed of wave propagation within the Object 102, and by comparing the time a signal registers on each of the Sensors 104a to 104m, the location of the impact may be determined by the Impact Triangulater 210. With two sensors, impact location may be determined as being at a select few positions, depending upon Object 102 shape and composition. For an Object 102 which is struck in a few known locations, two sensors may be sufficient to accurately identify the point of impact. In some alternate embodiments, three or more Sensors 104a to 104m may be used to perform a true triangulation of the point of impact.

After location is determined, the Signal Amplitude Calibrator 212 may determine the amplitude of the impact signals. This amplitude value may then be correlated to the force of the impact. Amplitude may be determined by the Signal Amplitude Calibrator 212 by multiplying the signals received by the Sensors 104a to 104m by a corrective factor. This corrective factor may be dependent upon the Object 102 properties, such as its dampening characteristics, along with the impact location data generated by the Impact Triangulater 210.

Information from the Impact Triangulater 210 and Signal Amplitude Calibrator 212 may be sent to the Data Outputter 214 for outputting. The Data Outputter 214 may transform the data into a format digestible by downstream systems. This output may be seen at 108.

Figure 2B:
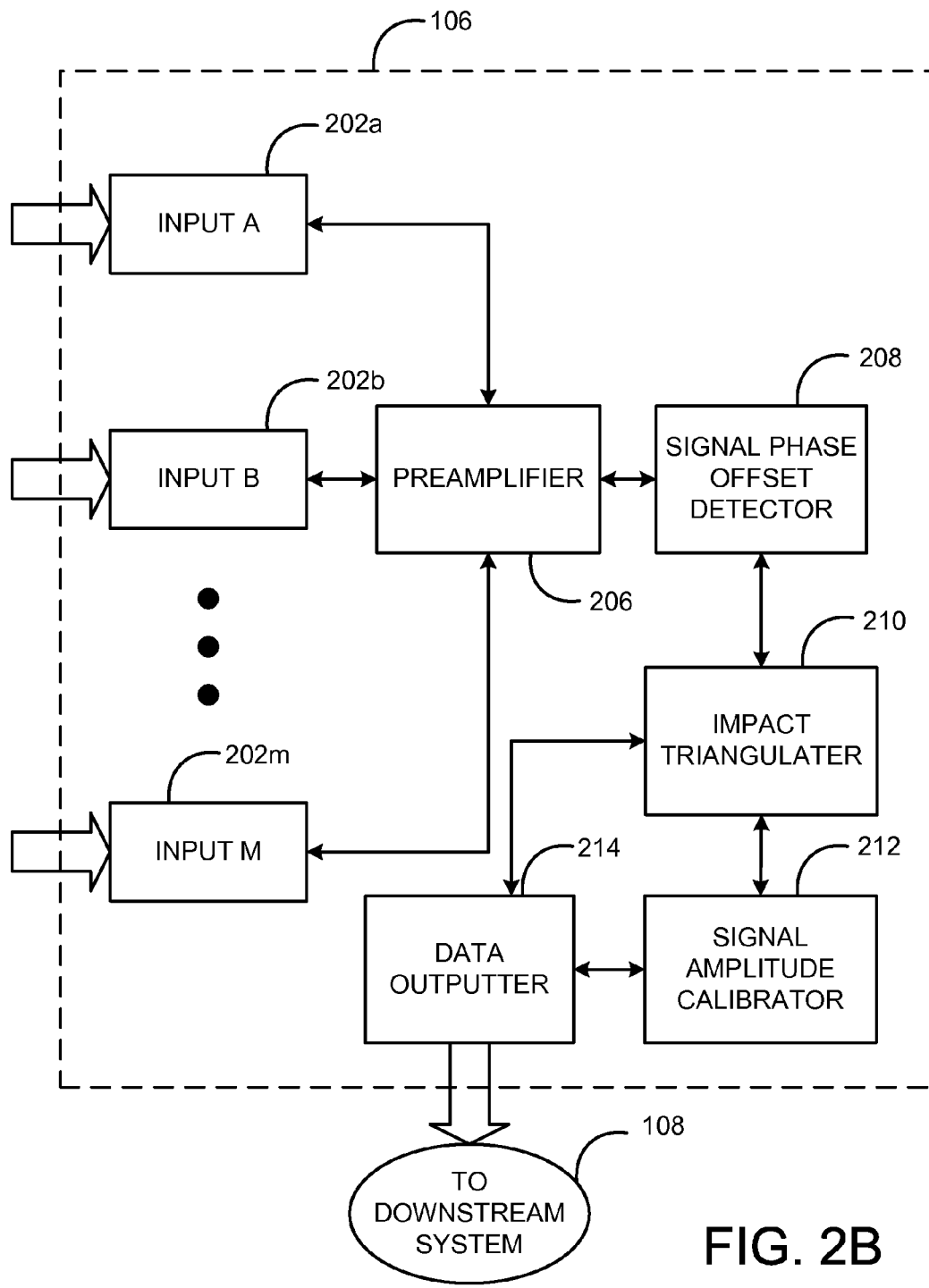
FIG. 2B illustrates another embodiment of a block diagram of the signal processor of the impact location and amplitude sensory system in accordance with an embodiment of the present invention.

FIG. 2B illustrates another embodiment of a block diagram of the Signal Processor 106 of the Impact Location and Amplitude Sensory System 100. Similar to the embodiment at FIG. 2A, the present illustration has signals from the Sensors 104a to 104m being received by the one or more Inputs 202a to 202m. In some embodiments, Inputs 202a to 202m may correspond on a one-to-one basis with the Sensors 104a to 104m. This illustrated Signal Processor 106 may be of particular use with Sensors 104a to 104m which are accelerometers.

The signals from the Inputs 202a to 202m may then be sent to a Preamplifier 206. Unlike piezos, which may require filtering of particular wavelengths, the accelerometer Sensors 104a to 104m signals are just sent to the Preamplifier 206 for amplification. In some embodiments, additional signal conditioning may be performed by the Preamplifier 206. The amplified signals may then be sent to a Signal Phase Offset Detector 208 to analyze the phase offset of each signal.

Each Object 102 has a natural resonant vibration, known as a transverse wave. The Sensors 104a to 104m may be able to register this oscillation. When an impact occurs, the natural oscillations of the Object 102 are disrupted; thereby resulting in phase shifts of the Object 102 vibration. These vibration phase shifts may be used to determine impact timing and location.

Data regarding impact timing and location of impact sensed by each of the Sensors 104a to 104m may then be sent to the Impact Triangulater 210 for triangulation of the impact location. Again, when a single Sensor 104a is in use, location may be difficult to determine. Typically multiple sensors are more adapted to generate impact location data. With two sensors, impact location may be determined as being at a select few positions, depending upon Object 102 shape and composition. For an Object 102 which is struck in few locations, two sensors may be sufficient to accurately identify the point of impact. In some alternate embodiments, three or more Sensors 104a to 104m may be used to perform a true triangulation of the point of impact.

After location is determined, the Signal Amplitude Calibrator 212 may determine the amplitude of the impact signals. This amplitude value may then be correlated to the force of the impact. Amplitude may be determined, in some embodiments, by the Signal Amplitude Calibrator 212 by looking to the degree of phase shift of the resonant frequency.

Information from the Impact Triangulater 210 and Signal Amplitude Calibrator 212 may be sent to the Data Outputter 214 for outputting. The Data Outputter 214 may transform the data into a format digestible by downstream systems. This output may be seen at 108.

Figure 2C:
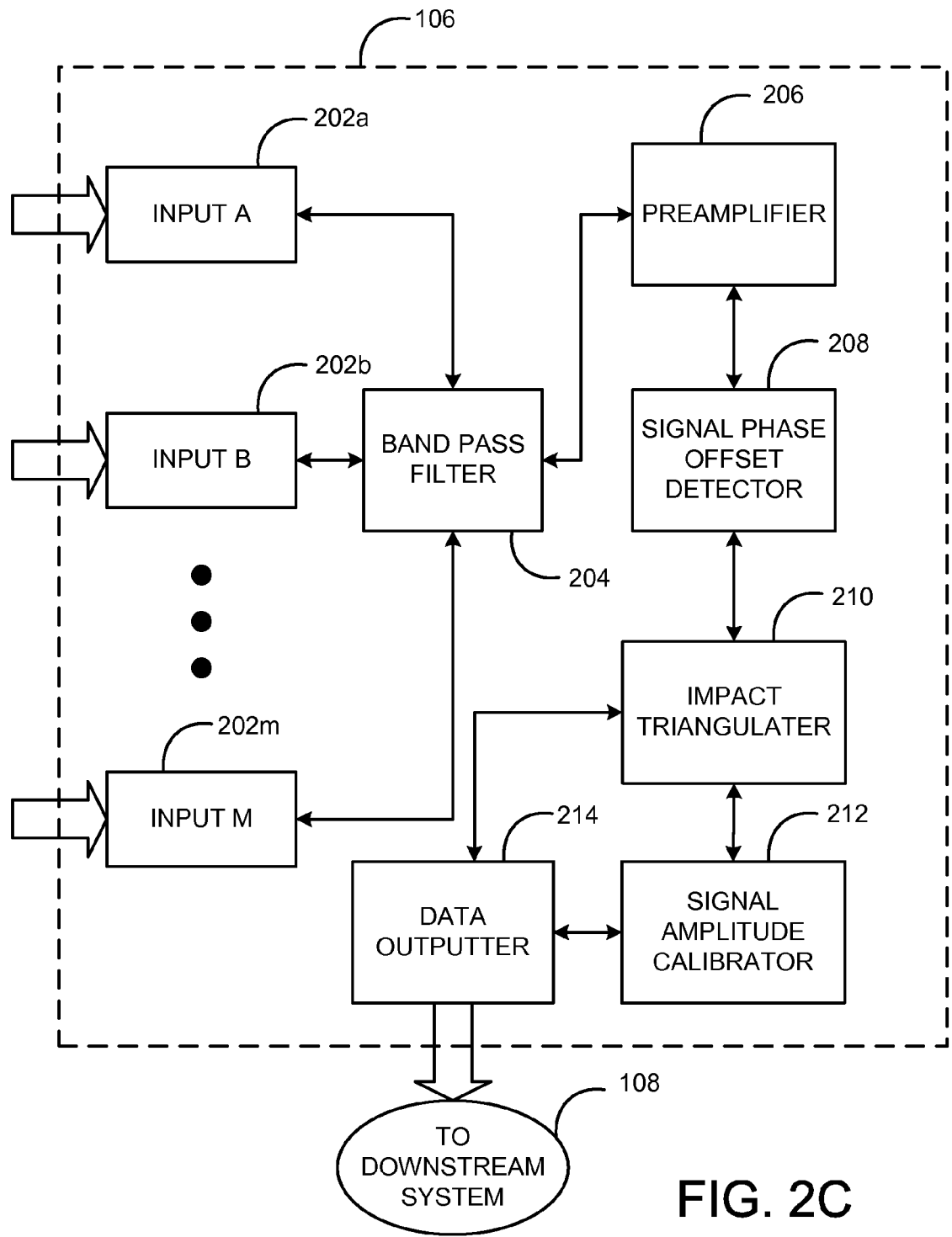
FIG. 2C illustrates yet another embodiment of a block diagram of the signal processor of the impact location and amplitude sensory system in accordance with an embodiment of the present invention.

FIG. 2C illustrates yet another embodiment of a block diagram of the Signal Processor 106 of the Impact Location and Amplitude Sensory System 100. This present embodiment may be of particular use when both piezoelectric microphones and accelerometers are used as the Sensors 104a to 104m. The present illustration has signals from the Sensors 104a to 104m being received by the one or more Inputs 202a to 202m. In some embodiments, Inputs 202a to 202m may correspond on a one-to-one basis with the Sensors 104a to 104m.

The signals from the Inputs 202a to 202m may then be sent to a Band Pass Filter 204 for filtering inputs from piezo Sensors 104a to 104m. Signals from accelerometer Sensors 104a to 104m may forgo this step. All signals may then be sent to the Preamplifier 206 for amplification. In some embodiments, additional signal conditioning may be performed by the Preamplifier 206 and/or Band Pass Filter 204. The amplified signals may then be sent to a Signal Phase Offset Detector 208 to analyze the phase offset of each signal originating from an accelerometer Sensors 104a to 104m.

Each Object 102 has a natural resonant vibration. The accelerometer Sensors 104a to 104m may be able to register this oscillation. When an impact occurs, the natural oscillations of the Object 102 are disrupted; thereby resulting in phase shifts of the Object 102 vibration. These vibration phase shifts may be used to determine impact timing and location in the manner detailed above.

Data regarding impact timing and location of impact sensed by each of the accelerometer Sensors 104a to 104m may then be sent to the Impact Triangulater 210 for triangulation of the impact location. Likewise, by knowing the speed of wave propagation within the Object 102, and by comparing the time a signal registers on each of the piezoelectric Sensors 104a to 104m, the location of the impact may also be determined by the Impact Triangulater 210. The results from the accelerometer and piezo Sensors 104a to 104m may be cross referenced to ensure proper identification of the location of the impact.

Again, when a single Sensor 104a is in use, location may be difficult to determine. Typically multiple sensors are more adapted to generate impact location data. With two sensors, impact location may be determined as being at a select few positions, depending upon Object 102 shape and composition. For an Object 102 which is struck in few locations, two sensors may be sufficient to accurately identify the point of impact. In some alternate embodiments, three or more Sensors 104a to 104m may be used to perform a true triangulation of the point of impact.

After location is determined, the Signal Amplitude Calibrator 212 may determine the amplitude of the impact signals. This amplitude value may then be correlated to the force of the impact. Amplitude may be determined, in some embodiments, by the Signal Amplitude Calibrator 212 by looking to the degree of phase shift of the resonant frequency. Likewise, amplitude may be determined by the Signal Amplitude Calibrator 212 by multiplying the signals received by the piezo Sensors 104a to 104m by a corrective factor. This corrective factor may be dependent upon the Object 102 properties, such as its dampening characteristics, along with the impact location data generated by the Impact Triangulater 210.

Information from the Impact Triangulater 210 and Signal Amplitude Calibrator 212 may be sent to the Data Outputter 214 for outputting. The Data Outputter 214 may transform the data into a format digestible by downstream systems. This output may be seen at 108.

Figure 3:
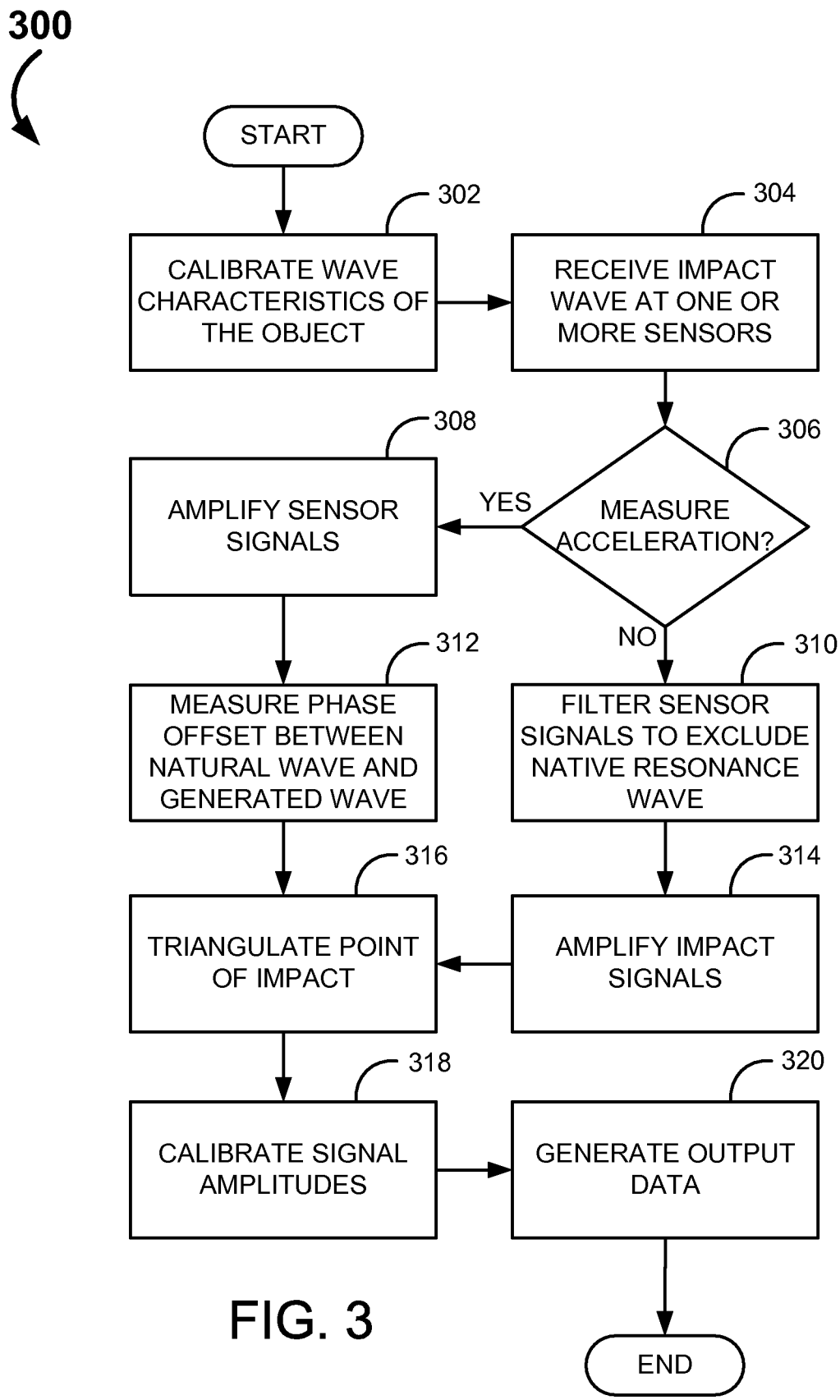
FIG. 3 illustrates an exemplary flow diagram for sensing impact location and amplitude in accordance with an embodiment of the present invention.

FIG. 3 illustrates an exemplary flow diagram for sensing impact location and amplitude, shown generally at 300. The process begins and then progresses to step 302 where the wave characteristics of the Object 102 are calibrated. In some embodiments, where a known Object 102 is used, this may include a selection of a preset. Where the Object 102 is preexisting, and no wave model is known, empirical testing or calibration may be required.

Once the wave characteristics of the Object 102 are known, the system may be able to receive impact data at the Sensors 104a to 104m. This data may include accelerometer data including phase shifting of the resonant vibration, or may include acoustic waves which propagate through the Object 102.

The process then progresses to step 306 where an inquiry is made as to whether the Sensors 104a to 104m measure acceleration, as is the case where accelerometers are the Sensors 104a to 104m. If acceleration is measured, the process then progresses to step 308 where the signals are amplified. The phase offset from the resonant frequency of the Object 102 is then performed at step 312. Then, at step 316 triangulation of the point of impact may occur. As previously mentioned, when an impact occurs, the natural oscillations of the Object 102 are disrupted; thereby resulting is phase shifts of the Object 102 vibration. These vibration phase shifts may be used to determine impact timing and location. This data regarding impact timing and location of impact sensed by each of the accelerometer Sensors 104a to 104m may then be sent to the Impact Triangulater 210 for triangulation of the impact location.

If, at step 306, acceleration is not measured, the process then progresses to step 310 where the signals from the piezo Sensors 104a to 104m are filtered. This filtering may exclude portions of the perceived signal which originate from the natural resonant wave of the piezo Sensors 104a to 104m. Again, these native waves tend to be of relatively high frequency, often around 20,000 to 30,000 Hz. A low pass filter may be used to filter signals. In some embodiments, both a low pass and a high pass filter may be used to selectively filter only the particular signals produced by the piezo sensors, thereby ensuring sensory capability over a wider range of signal frequencies. The filtered signals may then be amplified at step 314.

The process then progresses to step 316 where the location of the point of impact on the Object 102 may be triangulated. As noted, by knowing the speed of wave propagation within the Object 102, and by comparing the time a signal registers on each of the piezoelectric Sensors 104a to 104m, the location of the impact may be determined by the Impact Triangulater 210.

Then, at step 318 signal amplitude may be calibrated. This amplitude value may then be correlated to the force of the impact. Amplitude may be determined, in some embodiments, by the Signal Amplitude Calibrator 212 by looking to the degree of phase shift of the resonant frequency. Likewise, amplitude may be determined by the Signal Amplitude Calibrator 212 by multiplying the signals received by the piezo Sensors 104a to 104m by a corrective factor. This corrective factor may be dependent upon the Object 102 properties, such as its dampening characteristics, along with the impact location data generated by the Impact Triangulater 210.

The process then progresses to step 320 where location coordinates and amplitude data, as a measure of impact force, may be output to a down stream system. The process then ends.

Figure 4:
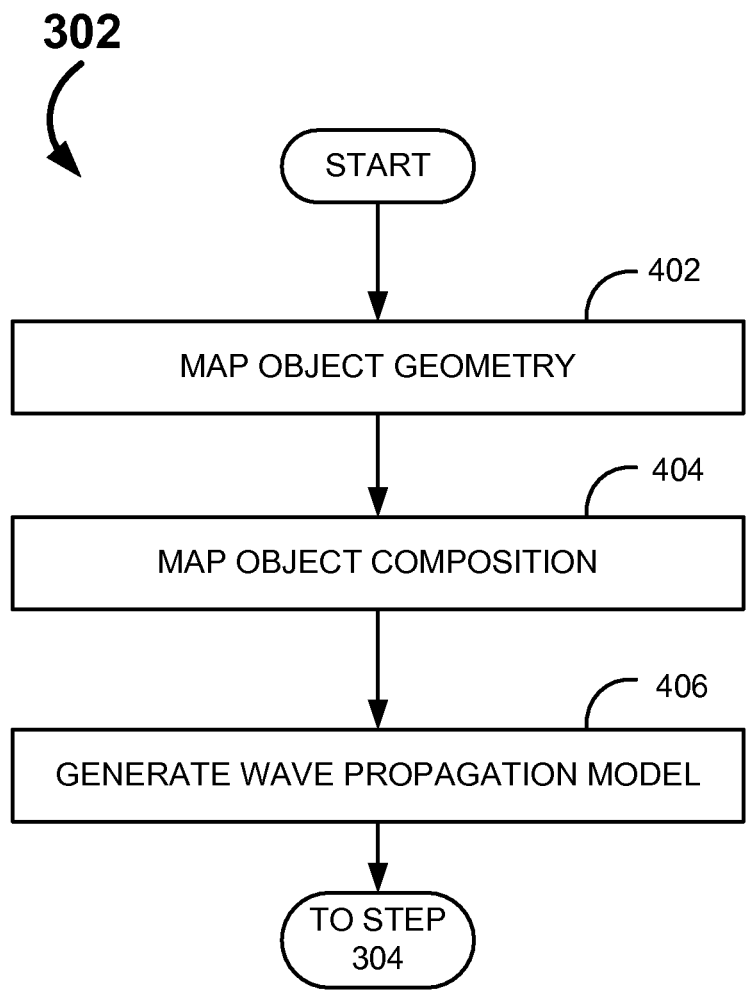
FIG. 4 illustrates an exemplary flow diagram for calibrating wave propagation characteristics for the object being sensed in accordance with an embodiment of the present invention.

FIG. 4 illustrates an exemplary flow diagram for calibrating wave propagation characteristics for the object being sensed, shown generally at 302. The process begins and progresses to step 402 where the geometry of the Object 102 is mapped. Object 102 geometry includes shape and dimensions of the Object 102. Likewise, at step 404, the composition of the Object 102 is mapped. As is known, sound waves travel at differing rates through differing mediums. Thus, a non-homogenous composition of the Object 102 may have a large impact upon wave propagation as well as natural resonant frequency.

Then, at step 406, a wave propagation model may be generated. In some embodiments, the Sensors 104a to 104m may be coupled to the Object 102 and the Object 102 is struck at a plurality of particular locations to generate the wave propagation model. In other embodiments, a preset model may be generated referencing the shape, size and composition of the Object 102. In some alternate embodiments, the Object 102 may be thoroughly studied in a controlled laboratory to generate exact wave characteristics. The level of accuracy of the wave propagation model may depend upon method of its generation, and may be variable dependent upon intended use. Thus, for a mass produced item of exact specification, where impact sensation is desired, a highly accurate model may be desired. For an impromptu impact sensory addition to a unique, preexisting item, the costs of a highly accurate model may outweigh the potential benefits, and thus a less accurate approximation may be used.

The wave propagation model may include information as to the speed of sound waves traveling through the Object 102. The reduction in amplitude for sound waves as they travel through the Object 102. The natural resonant frequency of the Object 102, and how impacts alter the phase of this natural resonant frequency. The process then concludes by progressing to step 304 of FIG. 3.

The following FIGS. 5A to 11 and description pertain to specific examples of the Impact Location and Amplitude Sensory System 100 in use with a practical system.

Figure 5A:
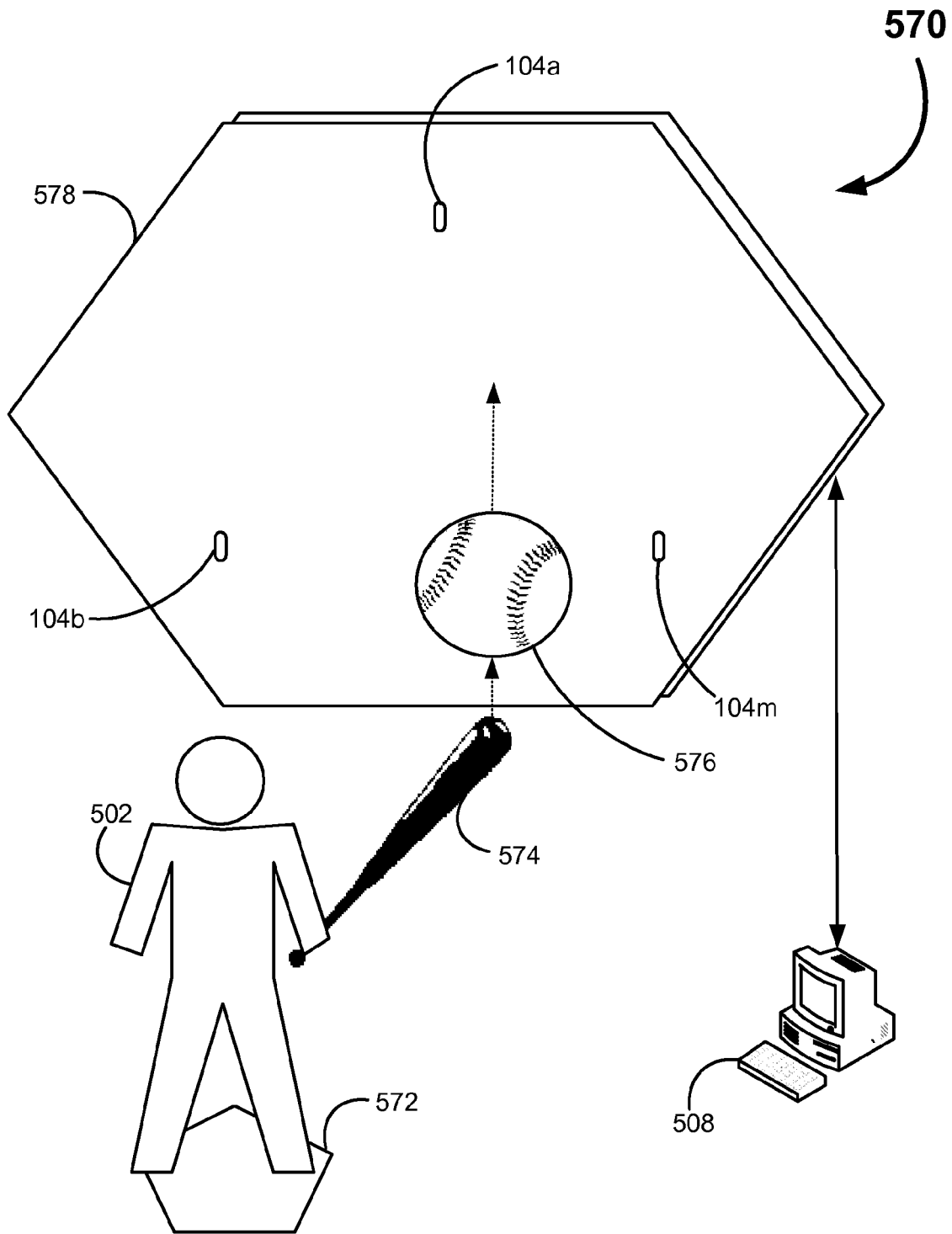
FIG. 5A shows an exemplary illustration of a baseball response system utilizing the impact location and amplitude sensory system in accordance with an embodiment of the present invention.

FIG. 5A shows an exemplary illustration of a Baseball Response System 570 utilizing the Impact Location and Amplitude Sensory System 100. In this example, a User 502 may stand on a Batting Platform 572. The User may then swing a Bat 574 at a Baseball 576 and hit the baseball against an Impact Panel 578. The Baseball 576 may be pitched to the User 502, or may be on a stationary stand. Sensors 104a to 104m may sense the location of the impact in the Panel 578 and send the location and amplitude information to a Computer 508 for processing. Distance and location of the hit may then be computed for training or enjoyment purposes. Such a system may be easily incorporated into preexisting batting cages for enhanced user feedback.

Figure 5B:
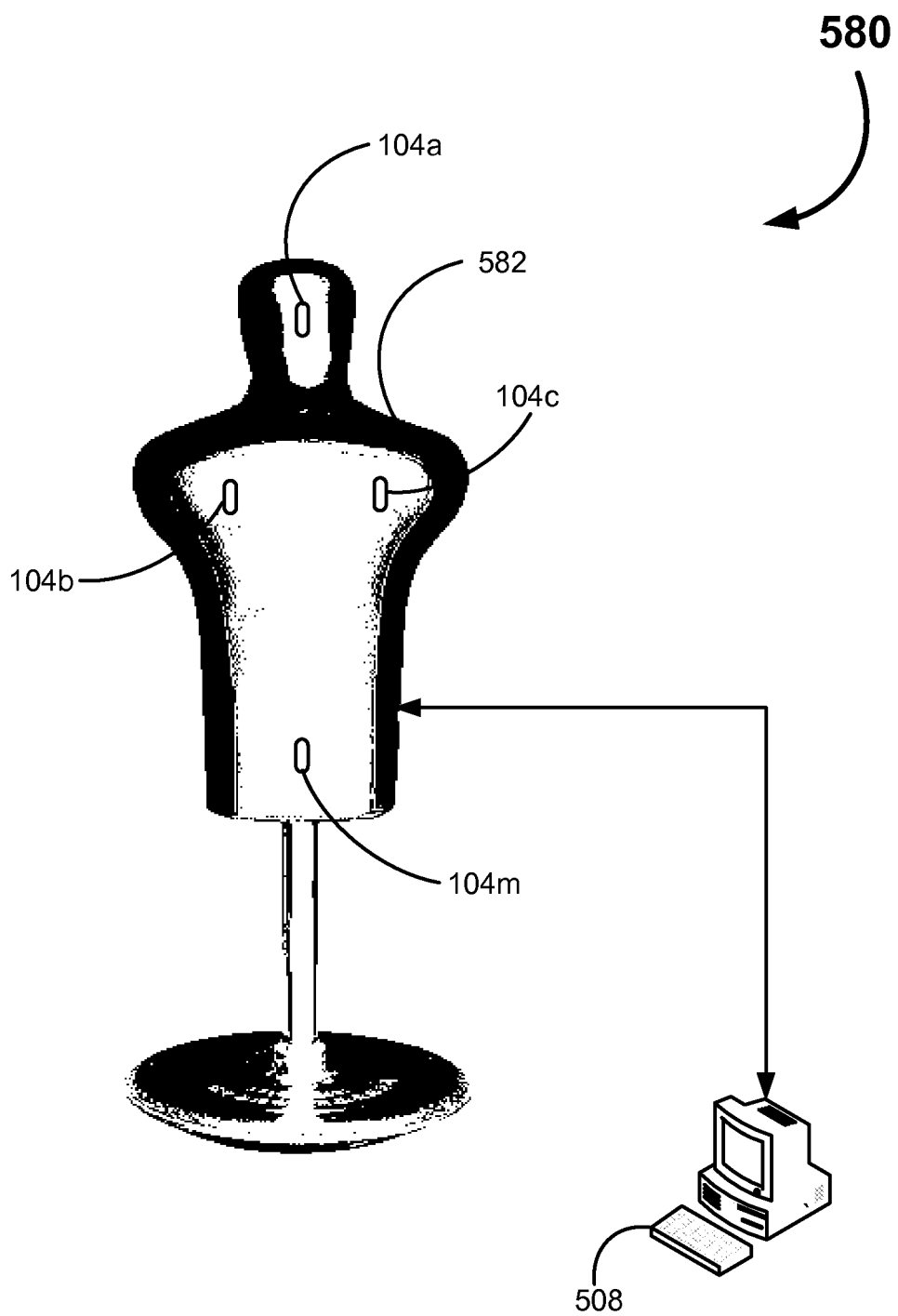
FIG. 5B shows an exemplary illustration of a boxing response system utilizing the impact location and amplitude sensory system in accordance with an embodiment of the present invention.

FIG. 5B shows an exemplary illustration of a Boxing Response System 580 utilizing the Impact Location and Amplitude Sensory System 100. A user (not shown) may strike the Boxing Dummy 582. Sensors 104a to 104m may sense the impact location and force of the impact and output the data to a Computer 508 for processing. Due to the complex shape of the Boxing Dummy 582, more Sensors 104a to 104m may be utilized to ensure accurate strike data.

Figure 6A:
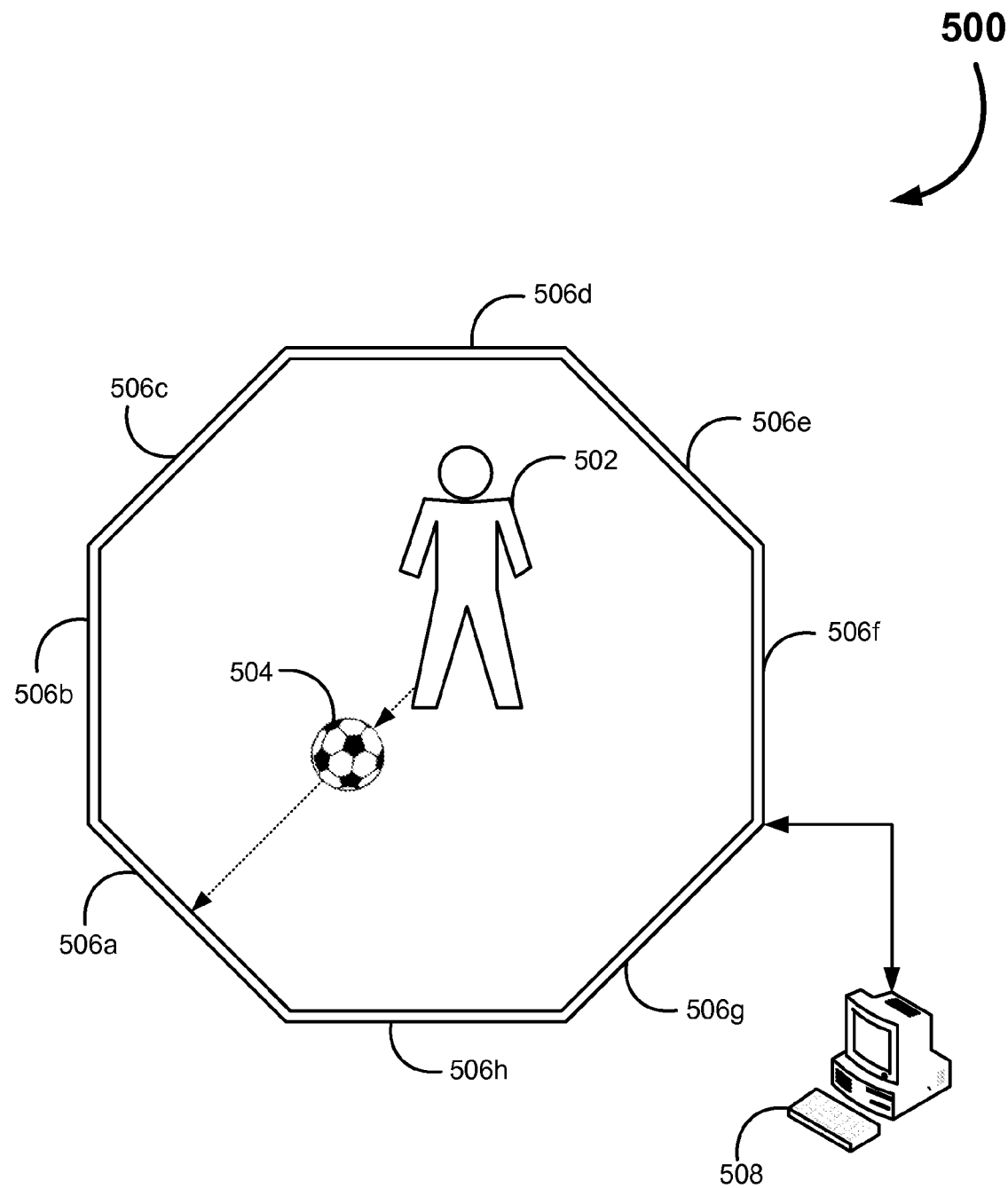
FIG. 6A shows an exemplary illustration of a soccer response system utilizing the impact location and amplitude sensory system in accordance with an embodiment of the present invention.

FIG. 6A shows an exemplary illustration of a Soccer Response System 500 utilizing the Impact Location and Amplitude Sensory System 100. While, the present illustration details the User 502 playing soccer, or European football, it is imaginable that this system could be adapted to any sport.

In this illustration, the User 502, along with a Soccer Ball 504, are within a playing ring made up of one or more Panels 506a to 506h. While in this and following illustrations eight Panels 506a to 506h are illustrated, more or fewer Panels 506a to 506h are contemplated by the present invention. In fact, in some embodiments, the ring may be modular, enabling the addition of removal of Panels 506a to 506h as is desired to change the layout and/or difficulty of the exercise.

The Panels 506a to 506h may be coupled to a Computer 508 which may include the Signal Processor 106. The Computer 508 may present commands to the User 502 as to which Panels 506a to 506h to kick the Soccer Ball 504 at. In some embodiments, the commands may additionally include distance commands. The User 502 may then obey the commands and kick the Soccer Ball 504 into the proper Panels 506a to 506h and at the proper force. The Panels 506a to 506h may each include Sensors 104a to 104m, which may then relay the impact data to the Computer 508 for processing. The Computer 508 may generate a score from the speed, location and force accuracy of the performance by the User 502.

This example may be easily adapted to a game for consumer use. In such embodiments, the Computer 508 may include a gaming consol such as the XBOX 360™. Likewise, this exemplary system may just as easily be adapted to be used as a training or therapeutic system.

Figure 6B:
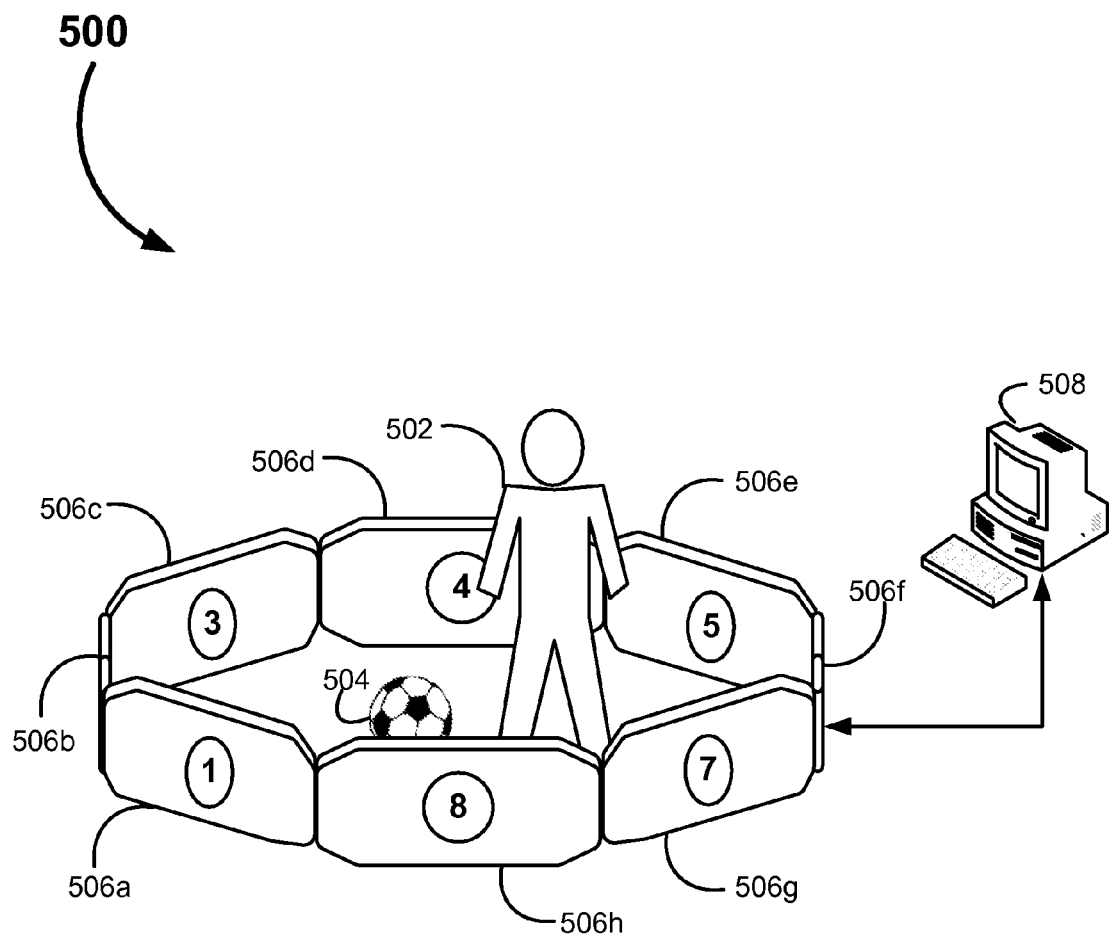
FIG. 6B shows another exemplary illustration of a soccer response system utilizing the impact location and amplitude sensory system in accordance with an embodiment of the present invention.

FIG. 6B shows another exemplary illustration of the Soccer Response System 500 utilizing the Impact Location and Amplitude Sensory System 100. This illustration provides a perspective view of the Soccer Response System 500, for better clarification. In some embodiments, the Panels 506a to 506h may be labeled, here by number. This labeling may then be used when the commands are given by the Computer 508. Additionally, in some embodiments, the Panels 506a to 506h may include visual targets (not shown) to further narrow where the kicked Soccer Ball 504 should hit each Panel 506a to 506h.

Figure 6C:
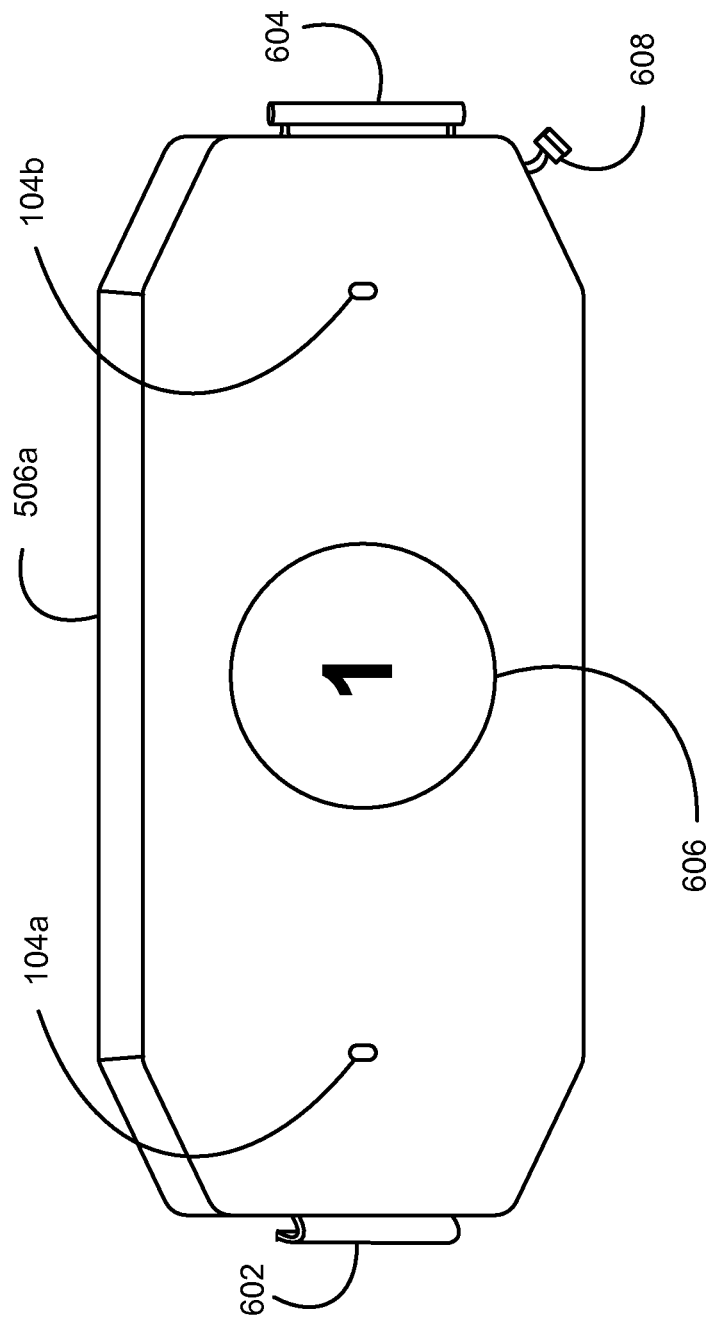
FIG. 6C shows an exemplary illustration of a panel of the soccer response system utilizing the impact location and amplitude sensory system in accordance with an embodiment of the present invention.

FIG. 6C shows an exemplary illustration of a Panel 506a of the Soccer Response System 500. For this given exemplary Panel 506a there may be two Sensors 104a and 104b. Of course additional or fewer Sensors 104a to 104m may be included in the Panel 506a, as is desired. However, since a kicked soccer ball will generally strike the Panel 506a at a given height, two Sensors 104a and 104b may be adequate for this application.

The Panel 506a may, in some embodiments, be a homogeneous, regularly sized surface, such as plywood, molded plastic or similar material. This makes the wave characteristics of the Panel 506a the same as all other Panels 506a to 506h.

Again the Label 606 may be seen on the exemplary Panel 506a. As previously noted, one or more targets (not shown) may also adorn the Panel 506a to further indicate to the User 502 where to aim the Soccer Ball 504.

On either end of the Panel 506a may be a Panel Coupler 602 and 604. Illustrated is but one of a plurality of coupler types, as is well known by those skilled in the art. Additionally, the Panels 506a to 506h may be joined to one another directly via screws, welding, adhesives, snap lock or other suitable method.

Additionally, an Electrical Coupler 608 may be seen. The Electrical Coupler 608 may couple to the next Panel 506b, and so on. In some embodiments, any number of Panels 506a to 506h may be coupled, each connected to one another by the Electrical Coupler 608. Signal data from the Sensors 104a to 104m may be sent via the Electrical Coupler 608 ultimately to the Computer 508.

Figure 7:
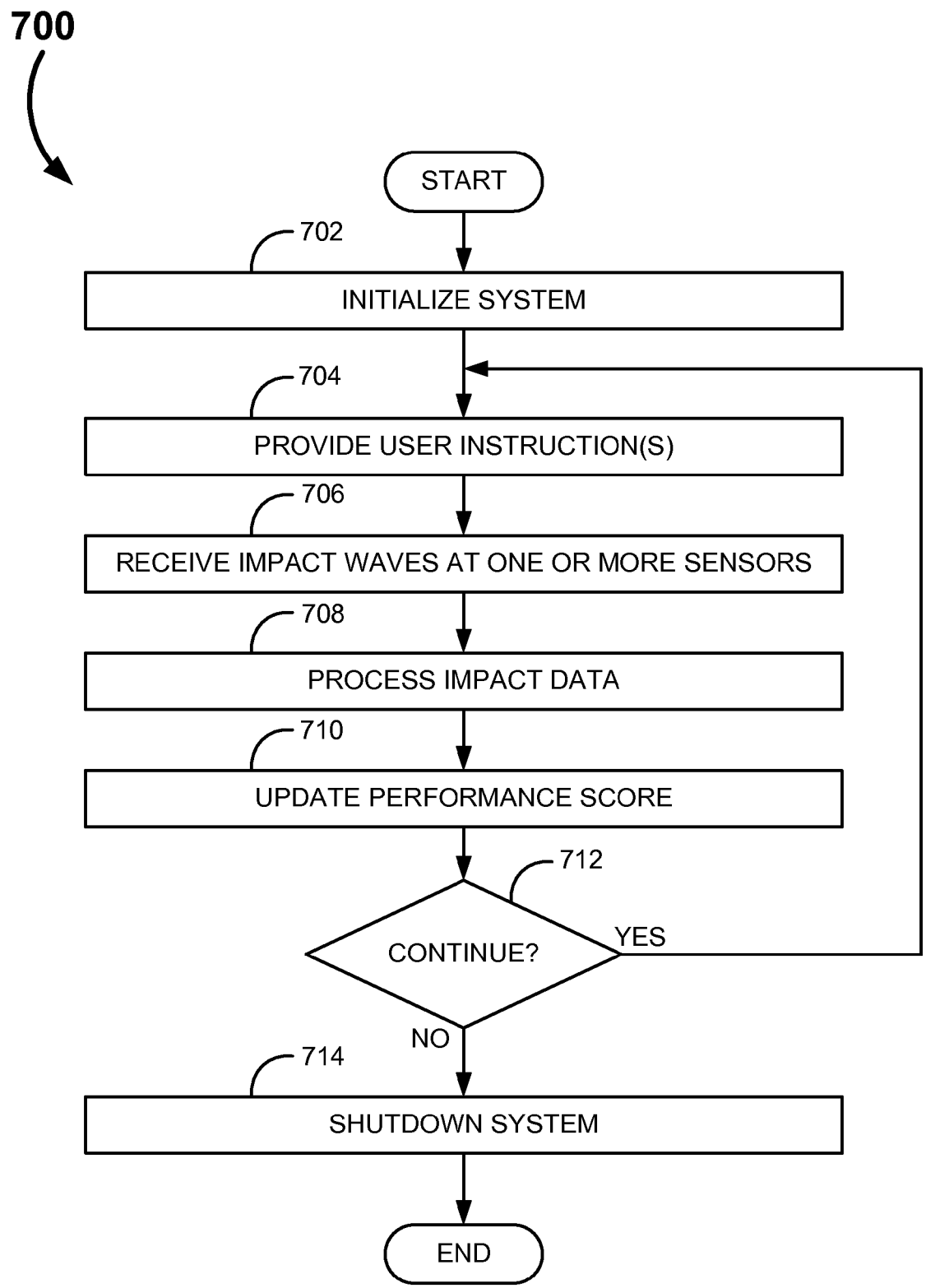
FIG. 7 illustrates an exemplary flow diagram for operation of the sensing soccer response system in accordance with an embodiment of the present invention.

FIG. 7 illustrates an exemplary flow diagram, shown generally at 700, for operation of the Soccer Response System 500. The process begins. The process then progresses to step 702 where the system is initialized. System initialization will be discussed in more detail in relation to FIG. 8 and associated text below.

The process then progresses to step 704 where the system provides the user with instructions. These instructions may be a verbal cue, or may include a visual cue. For example, lights on the appropriate Panel 506a may illuminate to indicate to the User 502 where to aim the Soccer Ball 504. Instructions may include both location and force/distance commands. Additionally, in some embodiments, instructions may include a series of commands.

The process then progresses to step 706 where the waves from the impact of the Soccer Ball 504 hitting one of the Panels 506a to 506h is received. The Sensors 104a to 104m sends the impact signals to the Computer 508 which includes the Signal Processor 106 for processing, at step 708. Processing the impact data may include generating impact location data and force data. At step 710 a score for the performance of the User 502 is updated. This score may include a per-round score and a total score.

The process then progresses to step 712 where an inquiry is made as to whether the process is to continue. If continuation is desired, the process then progresses to step 704 where new instructions are provided to the User 502, thereby starting another round. Otherwise, if no continuation is desired at step 712, the process then progresses to step 714 where the system shuts down. System shutdown may occur at the end of a particular number of preconfigured rounds, in response to an affirmative action by the User 502, or in response to a time out. The process then ends.

Figure 8:
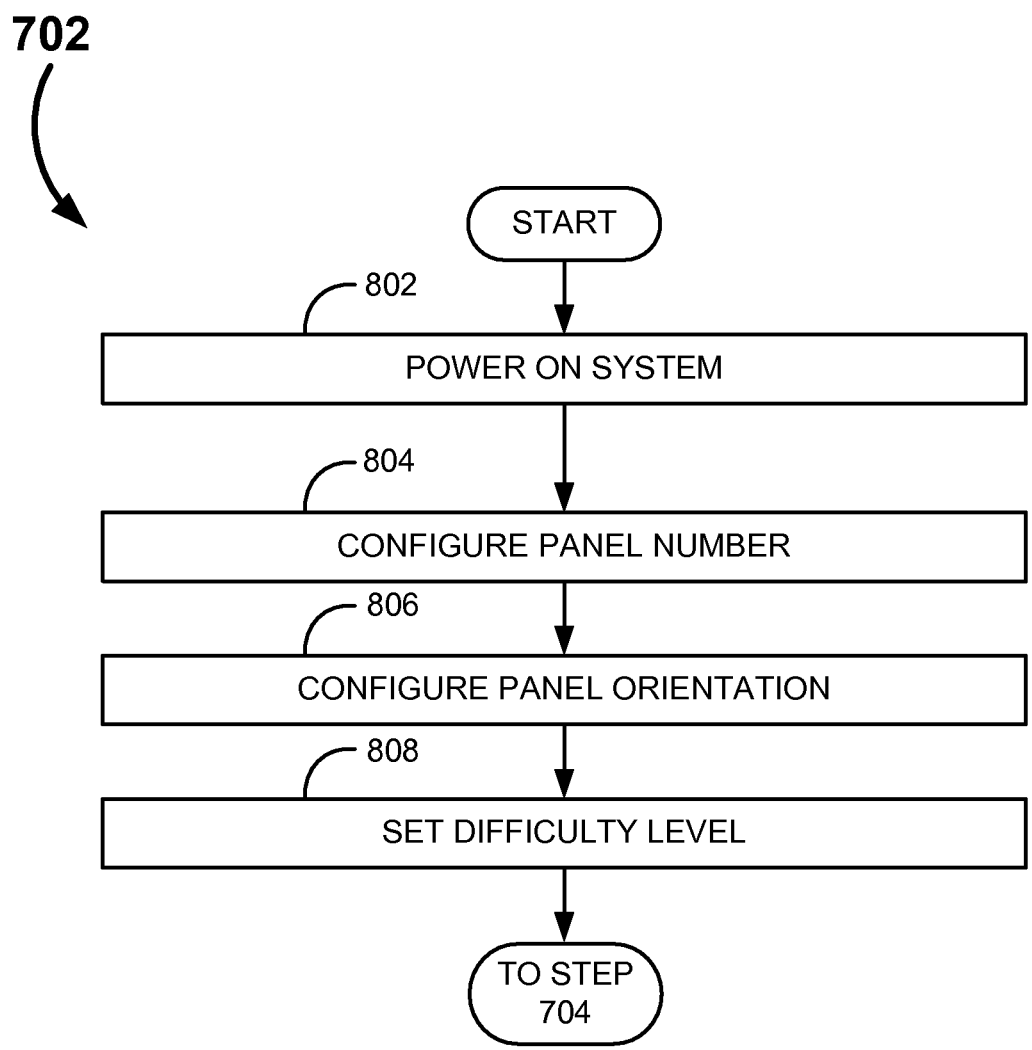
FIG. 8 illustrates an exemplary flow diagram for the initialization of the sensing soccer response system in accordance with an embodiment of the present invention.

FIG. 8 illustrates an exemplary flow diagram for the initialization of the Soccer Response System 500, shown generally at 702. The process begins. The process then progresses to step 802 where the system is powered on. Power on may be in response to the User 502 pushing an on switch, or may be tied to the signal levels for the Panels 506a to 506h. Thus, if the Sensors 104a to 104m of the Panels 506a to 506h sense an impact, that may initiate the power-on sequence.

The process then progresses to step 804 where the panel number is detected and configured. In some embodiments, panel orientation, via the angle of coupling may likewise be detected at step 806. In such embodiments, the ring may be set up in oblong or complex patterns as may be desired. User instructions and scoring may also reflect the irregular ring shape.

In some embodiments, the difficulty level may additionally be set, at step 808. Difficulty level may include narrowing the acceptable strike area to a particular target on each Panel 506a, shortening the acceptable response time for the User 502, or issuing series of instructions which require the User 502 to switch directions and/or feet. The process then concludes by progressing to step 704 of FIG. 7.

Figure 9:
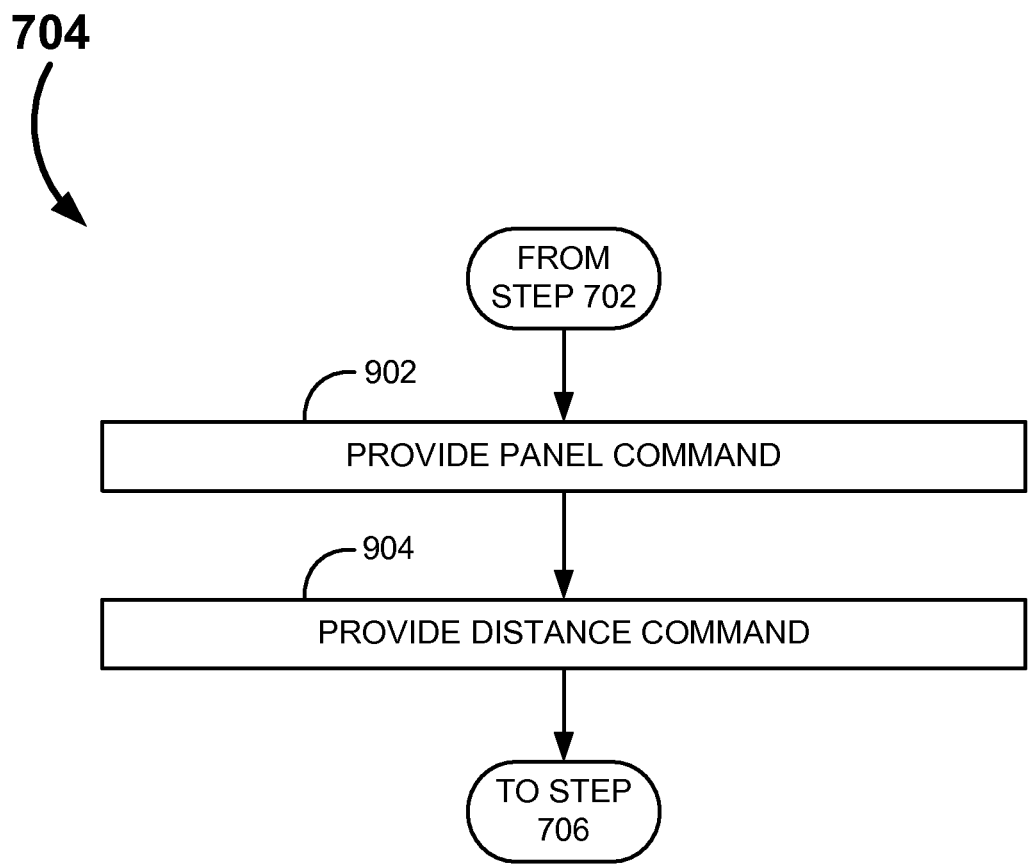
FIG. 9 illustrates an exemplary flow diagram for providing the user instructions for the sensing soccer response system in accordance with an embodiment of the present invention.

FIG. 9 illustrates an exemplary flow diagram for providing the user instructions for the Soccer Response System 500, shown generally at 704. The process begins from step 702 of FIG. 7. The process then progresses to step 902 where the Computer 508 generates a command for which Panel 506a the User 502 should kick the Soccer Ball 504. Likewise, at step 904, a command for the distance of the kick is provided. The process then concludes by progressing to step 706 of FIG. 7.

Commands, as previously discussed, may include visual cues, such as the panel lighting up or a graphical user interface. In some embodiments, three dimensional goggles or similar technology may be used with the Soccer Response System 500. Also, sound cues may be provided, alone or in combination with visual cues, to indicate commands.

Additionally, it should be noted that the commands may include a single action command or may require the User 502 to engage in a series of actions. Thus a "soccer memory" style exercise may be performed; where the length and complexity of commands increases with each round, the User 502 is successful in completing the instructions.

Lastly, in some embodiments, no commands may be provided. In these embodiments, the User 502 may engage in a simulated game, or may simply use the Soccer Response System 500 in a free-form manner. The Computer 508 may then record impact data for later review by the User 502, a coach or trainer.

Figure 10:
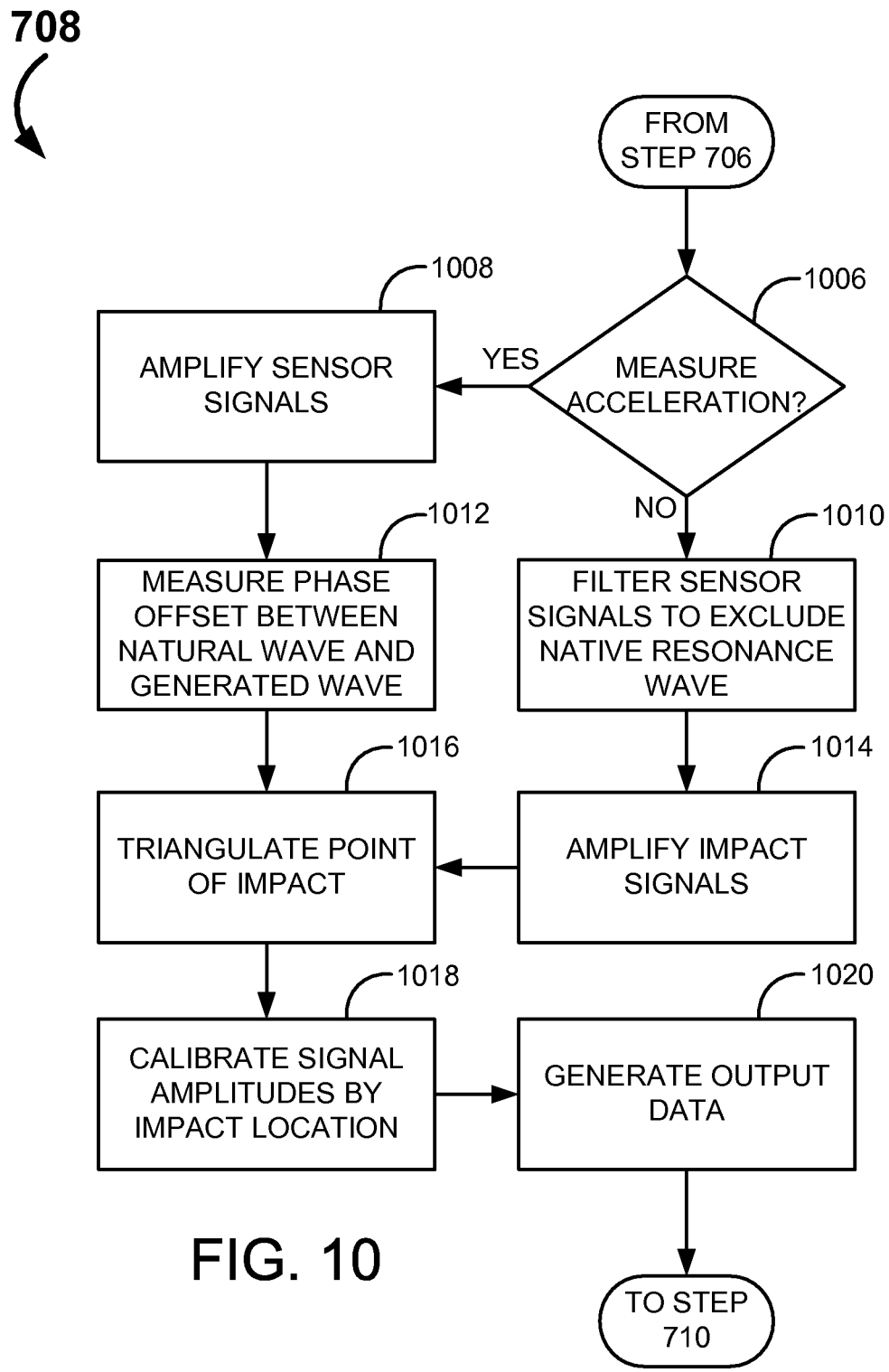
FIG. 10 illustrates an exemplary flow diagram for processing impact data by the sensing soccer response system in accordance with an embodiment of the present invention.

FIG. 10 illustrates an exemplary flow diagram for processing impact data by the Soccer Response System 500, shown generally at 708. This process is, in many ways, very similar to the generalized impact sensing process outlined in FIG. 3. The process begins from step 706 of FIG. 7. The process then progresses to step 1006 where an inquiry is made as to whether the Panel Sensors 104a and 104b measure acceleration, as is the case where accelerometers are used for the Panel Sensors 104a and 104b. If acceleration is measured, the process then progresses to step 1008 where the signals are amplified. The phase offset from the resonant frequency of the impacted Panel 506a is then performed at step 1012. Then, at step 1016 triangulation of the point of impact may occur. As previously mentioned, when an impact occurs, the natural oscillations of the Panel 506a are disrupted; thereby resulting in phase shifts of the Panel 506a vibration. These vibration phase shifts may be used to determine impact timing and location. This data regarding impact timing and location of impact sensed by each of the accelerometer Panel Sensors 104a and 104b may then be sent to the Computer 508 for triangulation of the impact location.

If, at step 1006, acceleration is not measured, the process then progresses to step 1010 where the signals from the piezo Panel Sensors 104a and 104b are filtered. This filtering may exclude portions of the perceived signal which originate from the natural resonant wave of the piezo Panel Sensors 104a and 104b. Again, these native waves tend to be of relatively high frequency, often around 20,000 to 30,000 Hz. A low pass filter may be used to filter signals. In some embodiments, both a low pass and a high pass filter may be used to selectively filter only the particular signals produced by the piezo sensors, thereby ensuring sensory capability over a wider range of signal frequencies. The filtered signals may then be amplified at step 1014.

The process then progresses to step 1016 where the location of the point of impact on the Panel 506a may be triangulated. As noted, by knowing the speed of wave propagation within the Panel 506a, and by comparing the time a signal registers on each of the piezoelectric Panel Sensors 104a and 104b, the location of the impact may be determined by the Computer 508.

Since the Soccer Ball 504 tends to strike the Panels 506a to 506h at a constant height, it is practical to use only two Panel Sensors 104a and 104b. Thus, while the term "triangulation" is being used, this term has been extended to include using the data from two Panel Sensors 104a and 104b along with a logical assumption to determine exact impact location.

Then, at step 1018 signal amplitude may be calibrated. This amplitude value may then be correlated to the force of the impact. Amplitude may be determined, in some embodiments, by the Computer 508 by looking to the degree of phase shift of the resonant frequency. Likewise, amplitude may be determined by multiplying the signals received by the piezo Panel Sensors 104a and 104b by a corrective factor. This corrective factor may be dependent upon the Panel 506a properties, such as its dampening characteristics, along with the impact location data.

The process then progresses to step 1020 where location coordinates and amplitude data, as a measure of impact force, may be output to a down stream system. The process then concludes by progressing to step 710 of FIG. 7.

Figure 11:
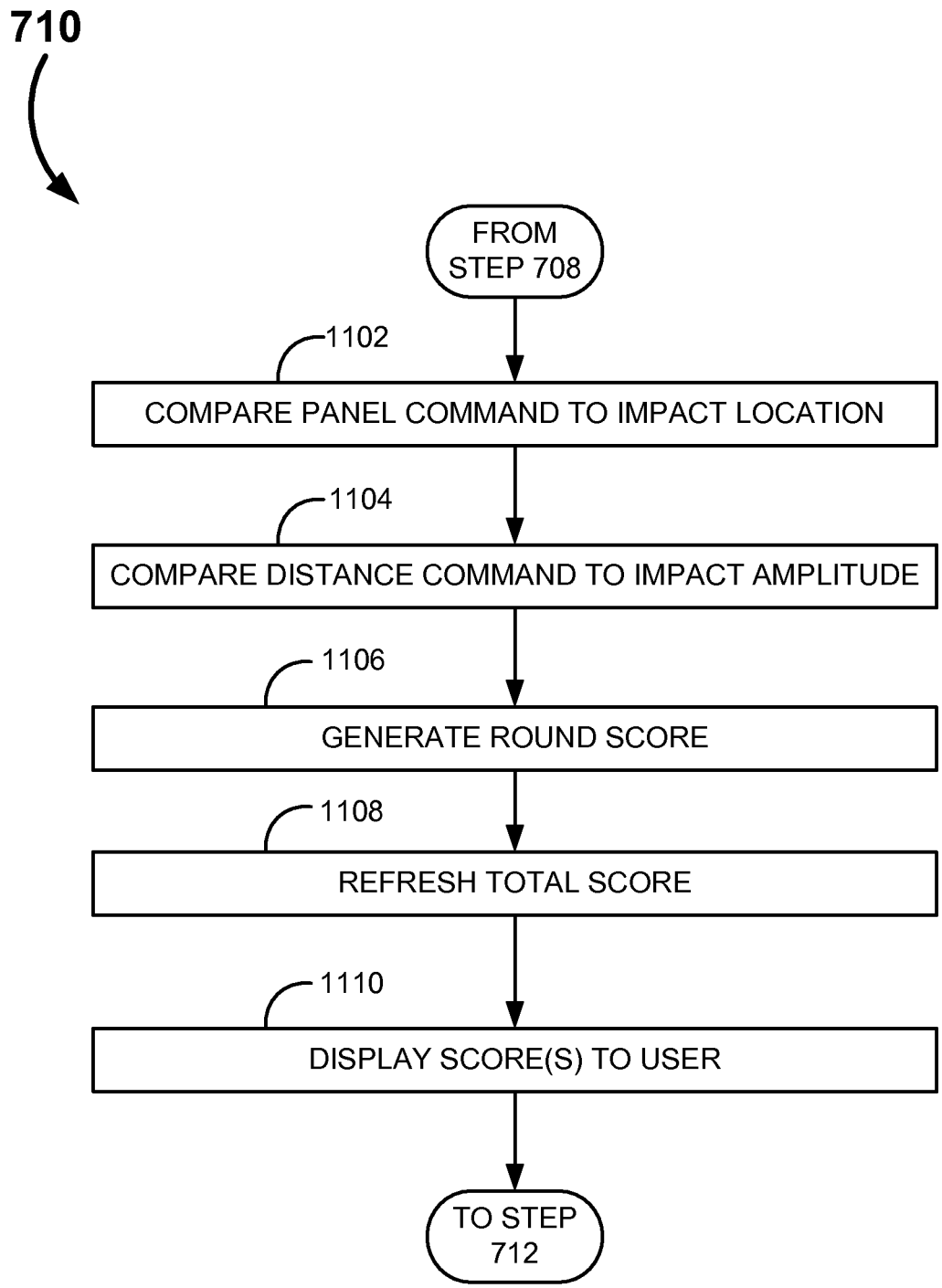
FIG. 11 illustrates an exemplary flow diagram for updating the performance score for the sensing soccer response system in accordance with an embodiment of the present invention.

FIG. 11 illustrates an exemplary flow diagram for updating the performance score for the Soccer Response System 500, shown generally at 710. The process begins from step 708 of FIG. 7. The process then progresses to step 1102 where the panel commands are compared to impact location. This comparison may be modulated by the set difficulty level. In some embodiments, it may be sufficient to merely strike the correct panel. In some alternate embodiments, the User 502 may be required to strike the Panel 506a in a particular location.

The process then progresses to step 1104 where the distance command may be compared to impact amplitude. A standard Soccer Ball 504 has known friction and mass characteristics. That, given what is known of turf resistance may be used to generate models of distance a Soccer Ball 504 will travel as dependent upon the force of the kick used. Since the impact amplitude is measured, force of the kick may be calculated. Thus, a close approximation of distance for the kick may likewise be calculated.

Lastly, although not shown, a timing score may be generated. The timing score may measure the time difference between providing the command and the impact. Larger time latency may indicate lower agility and will correspond to a lower score.

At step 1106, a round score may be generated. The round score may include any of the accuracy of location, accuracy of distance and reaction speed scores. In some embodiments, these scores may be summed, averaged, or in some way combined. Likewise, in some embodiments, the accuracy scores may be averaged, and the average modulated by the speed score.

Then, at step 1108 a total score may be refreshed by the generated round score. The total score may reflect the performance of the User 502 over each round. The total score may be a mere sum of each round score, or a running average. The total score may likewise track changes in round scores and provide other performance insights.

The scores may be displayed to the User 502 at step 1110. Score displays may include a visual display, printout, downloadable file, and/or audio announcement. After score display, the process then concludes by progressing to step 712 of FIG. 7.

In sum, systems and methods for an impact sensation is provided. While the disclosed impact sensation has been discussed for use in a soccer response system, it is also understood that the present impact sensory system has beneficial use in a wide range of gaming, training and sensory applications. For example, such a sensory system may be useful in a boxing dummy for determining strike locations and strength. Likewise, the present system may be useful in a coffee table; thereby transforming the surface into an input for controlling audio and video equipment, lighting, thermostat or any other desired application.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An impact sensory system, useful in conjunction with an object, the impact sensory system comprising:
    at least two accelerometers configured to couple to the object in a linear orientation, and wherein the at least two accelerometers measure resonant vibrations in the object which oscillate transversely to the linear orientation, and wherein the at least two accelerometers detect frequency shifted vibrations in the object, and wherein the frequency shifted vibrations occur in response to an impact on the object;
    a signal processor configured to couple to the at least two accelerometers, wherein the signal processor is further configured to identify a location of the impact by measuring the offset between the resonant vibrations and the frequency shifted vibrations; and
    a data outputter configured to output data regarding the location of the impact.

2. The impact sensory system of claim 1, wherein the signal processor further comprises a signal amplitude calibrator, wherein the signal amplitude calibrator identifies force of the impact by referencing degree of the detected frequency shift.

3. The impact sensory system of claim 1, wherein the signal processor uses a wave propagation model of the object to identify the location of the impact.

4. The impact sensory system of claim 3, wherein the signal processor uses the differences in frequency shift detected by each of the at least two accelerometers to identify the location of the impact.

5. The impact sensory system of claim 1, wherein the signal processor further comprises a preamplifier for amplification of the frequency shifts detected by at least two accelerometers.

6. The impact sensory system of claim 1, wherein the impact sensory system is integrated into a soccer response system, further comprising at least one sensory panel configured to from a ring, wherein each of the at least one sensory panel includes the at least one sensor for receiving an impact wave from an impact of a ball on said panel.

7. A method for sensing an impact, useful in conjunction with an impact sensory system and an object, the method comprising:
    sensing resonant vibrations in the object using at least two accelerometers coupled to the object in a linear orientation, wherein the resonant vibrations oscillate transversely to the linear orientation;
    detecting frequency shifted vibrations in the object, wherein the frequency shifted vibrations occur in response to an impact on the object;
    identifying a location of the impact by measuring the offset between the resonant vibrations and the frequency shifted vibrations; and
    outputting data regarding the location of the impact.

8. The method as recited in claim 7, further comprising identifying the force of the impact by referencing the degree of the detected frequency shift.

9. The method as recited in claim 7, wherein the sensing the resonant vibrations includes sensing object accelerations.

10. The method as recited in claim 9, wherein the identifying the location of the impact uses a wave propagation model of the object to identify the location of the impact.

* * * * *